(12) United States Patent
Blahnik et al.

(10) Patent No.: US 10,606,032 B2
(45) Date of Patent: Mar. 31, 2020

(54) OPTICAL LENS-ELEMENT SYSTEM FOR A SUPPLEMENTARY LENS IN FRONT OF A CAMERA MODULE OF AN ELECTRONIC DEVICE

(71) Applicant: Carl Zeiss AG, Oberkochen (DE)

(72) Inventors: Vladan Blahnik, Oberkochen (DE); Oliver Schindelbeck, Aalen (DE)

(73) Assignee: Carl Zeiss AG, Oberkochen (DE)

( * ) Notice: Subject to any disclaimer, the term of this patent is extended or adjusted under 35 U.S.C. 154(b) by 137 days.

(21) Appl. No.: 15/877,530

(22) Filed: Jan. 23, 2018

(65) Prior Publication Data

US 2018/0210173 A1  Jul. 26, 2018

(30) Foreign Application Priority Data

Jan. 23, 2017  (DE) .................... 10 2017 101 164

(51) Int. Cl.
| | |
|---|---|
| *G02B 15/02* | (2006.01) |
| *G02B 13/00* | (2006.01) |
| *G02B 9/06* | (2006.01) |
| *H04N 5/225* | (2006.01) |
| *G02B 15/12* | (2006.01) |
| *G02B 15/10* | (2006.01) |

(52) U.S. Cl.
CPC ............ *G02B 13/003* (2013.01); *G02B 9/06* (2013.01); *G02B 13/009* (2013.01); *G02B 13/0045* (2013.01); *G02B 15/10* (2013.01); *G02B 15/12* (2013.01); *H04N 5/2254* (2013.01); *H04N 5/2257* (2013.01)

(58) Field of Classification Search
CPC .... G02B 13/003; G02B 13/009; G02B 15/12; G02B 15/10; G02B 13/0045; G02B 9/06
See application file for complete search history.

(56) References Cited

U.S. PATENT DOCUMENTS 3,317,265 A * 5/1967 Coniglio ................ G02B 13/00
359/744

FOREIGN PATENT DOCUMENTS

GB             1034908          7/1966

OTHER PUBLICATIONS

English language translation of Office Action issued in German Patent Application No. DE 10 2017 101 164.1 (from which this application claims priority), dated Oct. 2, 2017.

* cited by examiner

*Primary Examiner* — Joseph P Martinez
(74) *Attorney, Agent, or Firm* — Falk Ewers; Ewers IP Law PLLC (57) ABSTRACT

A supplementary lens system for providing at least one supplementary lens in front of a camera module of an electronic device, the supplementary lens system including an object-side lens-element unit with positive refractive power and an image-side lens-element unit with positive refractive power. The object-side lens-element unit and the image-side lens-element unit are configured to generate an intermediate image between the object-side lens-element unit and the image-side lens-element unit. Furthermore, the invention relates to a supplementary lens for such a supplementary lens system.

27 Claims, 4 Drawing Sheets

FIG. 4

OPTICAL LENS-ELEMENT SYSTEM FOR A SUPPLEMENTARY LENS IN FRONT OF A CAMERA MODULE OF AN ELECTRONIC DEVICE

CROSS REFERENCE TO RELATED APPLICATIONS

This application claims priority to German patent application DE 10 2017 101 164.1, filed Jan. 23, 2017, the entire content of which is incorporated herein by reference.

TECHNICAL FIELD

The invention relates to an optical lens-element system for a supplementary lens in front of a camera module of an electronic device.

BACKGROUND

Today, mobile electronic devices such as, for example, mobile telephones, personal digital assistants ("PDAs"), or tablets are usually equipped with one or more camera modules. These camera modules are used for very different purposes, e.g., for creating portrait recordings, reading barcodes or recording video sequences. Many of these compact camera modules have a low standard resolution of between 0.3 megapixels ("MP", corresponding to VGA resolution) and 3 MP. For a few years now, use is increasingly made of high-resolution camera modules with 5 MP, 8 MP or 12 MP with rising market shares. All of these camera modules have a fixed focal length since a mechanism for adjusting the focal length would be complicated on account of the small installation depths and would be associated with high costs.

The fixed focal length represents a significant restriction for certain photographic tasks. By way of example, there is often the desire for a modifiable field angle when recording macroscopic details, when recording large structures, or when objects are far away. The known camera modules usually have a field angle of 75° (specified over the whole diagonal in the object space) and are provided with a front stop, usually on the object side in front of the first lens element, in rare cases with a stop directly after the first lens element.

In order to address the desire for a modifiable field angle, appropriate supplementary lenses are commercially available. In the case of wide-angle attachments or telephoto attachments, these supplementary lenses are designed as afocal supplementary lenses. This ensures that focused imaging is maintained at an infinite object distance. The necessary focusing can continue to be carried out using the camera module. Usually, afocal supplementary lenses are characterized by a magnification factor. Thus, a magnification factor of "0.6×" means that the focal length of the overall system including supplementary lens and camera module lens is reduced by a factor of 0.6 in relation to the focal length of the camera lens on its own. Hence, the corresponding field angle is increased. Conversely, a magnification factor of "2×" means that the focal length of the overall system including the supplementary lens and camera module lens is increased by a factor of 2 and the field angle is correspondingly reduced.

Commercially available supplementary lenses suffer from deterioration of the imaging performance, for example, at the edge of the image field; this is already considered bothersome in the case of an unmagnified observation. The deterioration of the imaging performance affects, in particular, the so-called asymmetry aberrations, i.e., coma, distortion, and astigmatism. Added thereto are deteriorations in the imaging as a result of a decentration or tilt of the supplementary optical unit in relation to the optical axis of the camera module.

A further problem is posed by the supplementary optical units, on account of their inherent design, having to become larger as an improved imaging performance is sought. If the known supplementary optical units go beyond a simple convex converging lens element and have an afocal design, a lens element with positive refractive power is combined with a lens element with negative refractive power. If higher imaging performances, e.g., a magnification factor of "4×", are sought, a resulting diameter for a suitable supplementary optical unit can be calculated to be 65 mm without housing. Although these dimensions can be realized in theory, they have unsatisfactory handling as a consequence in practice. Firstly, the supplementary optical unit then dominates the combination of mobile electronic device and supplementary optical unit on account of its sheer size, and so the advantage of such an additional optical unit over a dedicated camera is lost in this respect.

Secondly, two or more camera modules are increasingly installed next to one another in the aforementioned mobile electronic devices. By way of example, these are used for stereo recordings or distance measurements, or have two different focal lengths which are used for different purposes. If two camera modules are used next to one another, distances of between 9 mm and 20 mm are common, for example. If the supplementary optical unit had the aforementioned dimensions, one of the two camera modules would be covered when the supplementary optical unit is used.

SUMMARY

It is an object of the invention to provide an optical lens-element system for a supplementary lens in front of a camera module of an electronic device, the optical lens-element system mitigating the aforementioned disadvantages and, in particular, having a smaller external diameter than the known supplementary lenses.

The supplementary lens system according to an aspect of the invention having at least one supplementary lens in front of a camera module of an electronic device has an object-side lens-element unit with positive refractive power and an image-side lens-element unit with positive refractive power. By way of example, such a camera module can be used in a mobile telephone or in an industrial setting, for example on a robotic arm. The camera module of such an electronic device has an imaging lens. Provision is made for an intermediate image to be producible between the object-side lens-element unit and the image-side lens-element unit. By way of such an arrangement of the lens-element units, there is a deviation from the previously customarily used design, which corresponds to a Galilean telescope. Instead, use is made of a design which is comparable to the design of a Kepler telescope. This approach has a number of advantages. On account of the formation of the intermediate image, the overall diameter of the supplementary optical unit remains significantly smaller in comparison with the Galilean design conventionally used until now.

At the same time, the presence of an intermediate image provides the option of undertaking near-field interventions and thus, for example, introducing filter elements.

Finally, the intermediate image offers an interface at which different supplementary optical unit elements can be connected.

In an exemplary embodiment, the object-side lens-element unit has a first focal length f1, the image-side lens-element unit has a second focal length f2, and the two lens-element units have a distance d from one another, wherein the sum of the two focal lengths corresponds to the distance of the principal planes of both lens-element units:

$$f1+f2=d.$$

By way of this relationship, also referred to as Kepler's condition, the focal points of the two lens-element units coincide and the intermediate image is imaged on the sensor area of the camera module by the second lens-element unit together with the optical unit of the camera module. An upside-down and inverted image is formed on the sensor area. For the human observer of the image in the electronic device, this can be corrected in a preferably purely electronic manner. However, a purely optical correction with the use of prisms or mirrors or the like, or a combination of electronic and optical correction is also possible.

In one exemplary embodiment, the intermediate image is producible at the site which is spaced apart from the principal plane of the object-side lens-element unit by the first focal length f1 and spaced apart from the principal plane of the image-side lens-element unit by the second focal length f2. Consequently, the intermediate image is located at a site which is particularly suitable for a mechanical interface between the two lens-element units.

The supplementary lens system may have an afocal design. Hence, the supplementary lens system is non-imaging and suitable as a supplement in front of a camera module.

In an exemplary embodiment, the object-side lens-element unit and the image-side lens-element unit are matched to one another in respect of telecentricity, numerical aperture, and/or field dimension. This facilitates the provision of an interface between the object-side lens-element unit and the image-side lens-element unit, the interface facilitating, for example, a replaceability of the object-side lens-element unit for modifying the overall focal length or the field angle on account of the compatibility, then present, between the object-side lens-element unit and the image-side lens-element unit.

In this context, the object-side lens-element unit and the image-side lens-element unit are telecentric, have the same numerical aperture, and/or have the same field dimension. Tighter matching of the two lens-element units to one another in respect of the aforementioned variables yields to lower losses of contrast (providing diffraction-limited imaging) and less pronounced vignetting of the image, in which the image darkens towards the edge.

In an exemplary embodiment, the object-side lens-element unit and/or the image-side lens-element unit can be configured in such a way that a chief ray includes an angle of less than or equal to 15°, preferably less than or equal to 10°, particularly preferably less than or equal to 5° with the optical axis of the object-side lens-element unit. Observing this condition close to telecentricity ensures that, for example, an image produced by the object-side lens-element unit can be transferred without great losses to the image-side lens-element unit.

In an exemplary embodiment, the supplementary lens system has an object-side supplementary lens and an image-side supplementary lens, wherein the two supplementary lenses are couplable to one another. In the supplementary lens system according to an aspect of the invention, simple ability to couple the object-side lens-element unit with the image-side lens-element unit is particularly advantageous. Firstly, this facilitates replacement of the lens-side supplementary lens system in order to adapt the overall supplementary lens system to various applications. At the same time, it is possible, after purchasing the supplementary lens system for the camera module of a certain electronic device, to continue to use the already purchased lens-side supplementary lenses without adaptation by replacing the image-side supplementary lens.

In this context, the two supplementary lenses are couplable to one another by an interface and the interface is arranged in the region of the intermediate image. The interface may have a mechanical character. By way of example, use can be made here of a known lens coupling apparatus such as a bayonet closure system, a screw closure or a magnetic holder. Arranging the mechanical interface in the region of the intermediate image facilitates a combination of a mechanical and an optical interface, which has a particular flexibility of the whole supplementary lens system as a consequence. At the same time, it is possible to produce the whole supplementary lens system with a particularly small diameter. In an exemplary embodiment of the invention, a field intervention apparatus is arranged in the region of the intermediate image. On account of the presence of an intermediate image, it is possible to perform near-field interventions. In contrast to interventions near the stop, these affect the whole image produced on the sensor of the camera module.

By way of example, a greyscale filter, a microlens array, and/or a field curvature plate may be provided as field intervention apparatuses.

A greyscale filter can be suitable for providing landscape recordings with a dynamic greyscale range. Such greyscale or grey profile filters can be used, e.g., in the case of landscape recordings, to darken a substantially brighter image region, e.g., the sky, in relation to another image region, e.g., the actual landscape. It is particularly advantageous in the present solution that such a filter can be used for all available supplementary lenses, i.e., both for wide-angle lenses and for telephoto lenses.

A microlens array can be used for producing light-field recordings. The supplementary lens system having such a microlens array consequently upgrades the camera module to a plenoptic camera.

A field curvature plate can perform a field intervention in such a way that the recording arising on the sensor conveys the impression of being recorded using a camera from the early stages of photography, having the corresponding aberrations (retro-look). It is also possible to perform a field intervention with a field curvature in such a way that a non-planar object field is imaged in focus. Thus, for example, a spherical or cylindrical object field can be imaged in focus on the entire object field using a corresponding field curvature plate. Furthermore, such a field curvature plate can also continuously image in focus plane objects in which the plane is not perpendicular to the optical axis. In terms of result, this corresponds to the features of a tilt or tilt shift lens.

In this context, it is particularly preferred for the field intervention apparatus to be couplable, in particular, mechanically couplable, to the interface. This facilitates simple mechanical solutions for inserting, plugging on, or plugging in the corresponding filters depending on the current use. In this context, it is also possible to design such a field intervention with only one component in a variable manner within the meaning of a near-field Alvarez-Lohmann manipulation.

In an exemplary embodiment of the invention, a pupil intervention apparatus is provided on the image side of the image-side lens-element unit. By way of example, a pupil forming apparatus, an apodization filter, or a phase element can be provided as a pupil intervention apparatus. The phase element introduces a wave front aberration, for example, for a blur effect with a spherical aberration. Such a phase intervention can also be variable with a neutral position. In this context, the pupil intervention apparatus is couplable, in particular, mechanically couplable, to the interface.

In a supplementary lens system, the object-side supplementary lens is designed as an imaging lens, in particular, as a wide-angle lens, a telephoto lens, a zoom lens, a macro lens, and/or a microscope objective. Consequently, it is possible with the supplementary lens system according to an aspect of the invention with only one image-side supplementary lens to couple on a number of different object-side supplementary lenses according to requirements and thus achieve different overall imaging types with, for example, different fields of view (FOVs).

According to an aspect of the invention, a supplementary lens for the supplementary lens system just described above is also provided.

In an exemplary embodiment, the supplementary lens provided as an image-side supplementary lens is designed in such a way that the camera module together with the supplementary lens images with a scale of 1:0.5 to 1:2. This firstly facilitates the use of the image-side supplementary lens as a macro supplement or microscope supplement. This consequently results in a corresponding object size which can be imaged in a format-filling manner in the case of sensor dimensions, as are usually encountered, of 5-7 mm in currently used camera modules and in the case of the image dimensions accompanying this. A resolution of approximately 2 µm can be achieved with an appropriate numerical aperture of the supplementary lens in the case of pixel dimensions or pixel periods as are currently encountered. This represents a noteworthy imaging performance accompanied by comparatively low costs and, at the same time, forms a very compact and mobile system in relation to conventional microscopes.

Here, it is particularly preferred if the supplementary lens as image-side supplementary lens forms a relay optical unit together with the camera module. This means that the image-side supplementary optical unit is designed in such a way that the intermediate plane, which is provided in accordance with a Kepler-type design, is imaged substantially 1:1 onto the sensor plane of the camera module, and vice versa.

In this context, provision can be made for a supplementary lens, in particular the image-side supplementary lens of the supplementary lens system, to have a receiving apparatus for an object carrier. Consequently, the resulting system composed of image-side supplementary lens and electronic device can be used as a compact and portable microscope system.

According to another aspect of the invention, the object carrier is embodied to be couplable to the interface. Consequently, the mechanical interface, present in any case, for the object-side supplementary lens can be used simultaneously on the part of the image-side supplementary lens for the purposes of fastening the object carrier.

For this use of the image-side supplementary lens, provision can be made of an illumination system for such a supplementary lens, wherein the illumination system is likewise couplable to the interface that is provided for an object-side supplementary lens.

The illumination system may have an aperture stop and/or a radiant field stop. In this way, it is possible, for example, to realize Köhler illumination and thus obtain a very uniform illumination distribution in the object plane.

In this context, the illumination system has an illumination aperture which is adaptable to the lens aperture and/or for the size of the illuminated object field to be adaptable.

It is likewise typical if the numerical aperture of a supplementary lens lies between 0.125 and 0.5, preferably at 0.25±0.1. This numerical aperture corresponds to the numerical aperture of many camera modules and represents a good compromise between a relatively small aperture and a relatively large aperture. Although the smaller aperture would make it easier to design the supplementary lens, it would lead to a larger lens-element diameter. By contrast, a significantly smaller lens-element diameter would emerge in the case of a larger aperture, but the design outlay would be significantly increased, and the larger aperture would lead to very short depth of field and hence to a significantly increased positioning outlay.

In an exemplary embodiment of the invention, the field dimensions lie at 6 mm±2 mm.

BRIEF DESCRIPTION OF THE DRAWINGS

The invention will now be described with reference to the drawings wherein.

DESCRIPTION OF EXEMPLARY EMBODIMENTS

Figure 1:
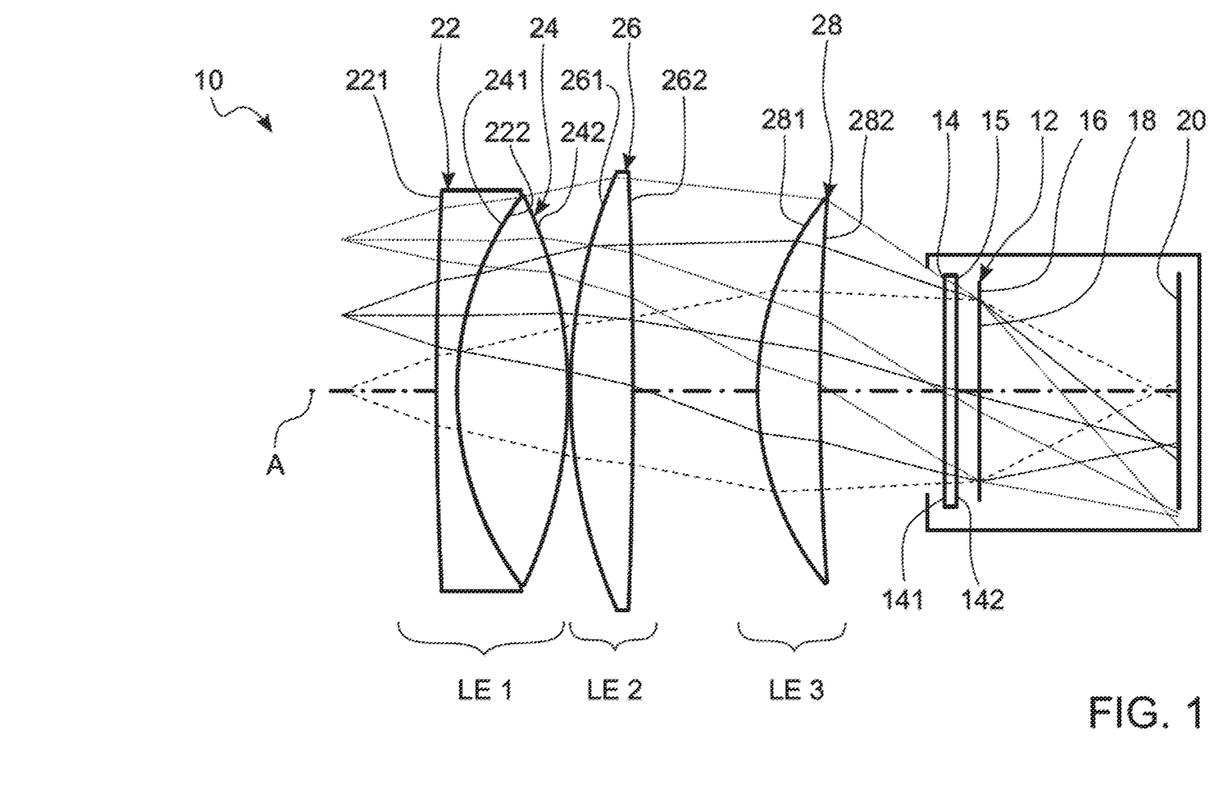
FIG. 1 shows, in a lens-element section, a first exemplary embodiment of a supplementary lens acting as a microscope supplementary lens.

FIG. 1 shows, in a lens-element section, a first exemplary embodiment of an optical lens-element system 10 for a supplementary lens of a supplementary lens. By way of example, the lens-element system illustrated here can be used in an image-side supplementary lens and thus form a supplementary lens system according to an exemplary embodiment of the present invention. It can be used as a single supplementary lens and serve as macro supplement/microscope supplement.

The lens-element section shown in FIG. 1 is substantially true to scale. In addition to the lens-element section, a camera module 12 with a cover slip 14, an aperture stop 15, a camera lens 16, which is represented by an ideal lens element 18, and with a sensor area 20 is illustrated in a schematic illustration. Furthermore, a central ray bundle and marginal ray bundles are illustrated here and in the following images for elucidating the imaging situation.

The lens-element system 10, described here as an exemplary embodiment, for the camera module 12 is designed as a three-part lens-element system and has three lens-element units LE1, LE2, LE3 and a total of four lens elements, namely a first lens element 22, a second lens element 24, a third lens element 26, and a fourth lens element 28, along a central optical axis A. The refractive power of the overall design is positive. Only spherical surfaces are provided in the design shown in FIG. 1 in order to keep the production costs low. Naturally, aspherical surfaces may also be used in place of the spherical surfaces if a particularly complicated correction of the optical system is intended to be achieved.

The lens-element system 10 itself does not have a stop. By contrast, the camera module 12 has an aperture stop 15 arranged on the object side in relation to the camera lens 16. The camera module 12 has, for example, a fixed focal length with FOV≈75° (FOV="field of view"; full diagonal in the object space). By way of example, the diameter of the entry pupil can be 1.5 to 2 mm. The apertures and stops shown in FIG. 1 do not necessarily represent the size and form thereof, but specify the position of the stop along the optical axis A.

Now, the design of the lens-element system 10 is described from left to right, i.e., from the object side to the image side.

The object-side first lens-element unit LE1 is constructed as a cemented element made of two lens elements, namely the first lens element 22 and the second lens element 24, with different glass types. The object-side first lens element 22 has the form of a meniscus with, overall, negative refractive power. The first lens element is manufactured from a first glass type, for example heavy lanthanum flint glass NLaSF9 (Schott), and has a convex surface 221 on the object side and a convex surface 222 on the image side.

The convex surface has a radius of curvature which can be 83.8557±4.19 mm.

However, it is true as a matter of principle that optical systems like the one described here can be increased or reduced in size proportionally, for example for adaptation to a different image size, and consequently the radii, diameters, thicknesses, and distances specified here should be understood merely to be exemplary.

The radius of curvature of the convex object-side surface 221 is greater than the radius of the likewise spherical concave surface 222 which can be, for example, 6.4250±0.32 mm.

The distance of the vertex of the image-side surface 222 from the vertex of the object-side surface 221 can be, for example, 0.4150±0.02 mm.

The second image-side lens element 24, which forms the second part of the cemented element LE1, is manufactured from a second glass type, for example heavy crown glass N-SK16, and has, on the object side, a spherically convex surface 241 with a radius of curvature which corresponds to that of the image-side surface 222 of the first lens element 22.

In the present description of the lens-element system 10 and in the subsequent exemplary embodiments, no further details will be discussed in respect of the optical properties of a cemented site between the lens elements since the influence thereof on the overall system is considered to be negligible.

The second lens element 24, which is in direct contact—i.e., there is no air gap—with the image-side surface 222 of the first lens element 22 by way of its object-side convex spherical surface 241, has convex curvature with a radius of curvature of −8.8889±0.44 mm on its image-side surface 242. The vertex of the image-side surface 242 has a distance of 2.22±0.11 mm from the vertex of the object-side surface 241.

A second lens-element unit, which substantially includes the third lens element 26, adjoins the lens-element unit LE1, just described above, with a minimal air gap. The third lens element 26 has a surface 261 with a convex curvature on the object side and a radius of curvature of 10.6175±0.53 mm, the vertex of which is spaced apart from that of the image-side surface 241 of the second lens element 24 by an air gap of 0.055±0.003 mm. The likewise convex image-side surface 262 of the third lens element 26 has a radius of −106.0916±5.3 mm and its vertex has a distance of 1.25±0.06 mm from that of the object-side surface 261. The third lens element 26 is likewise manufactured from a heavy crown glass, for example N-SK16 (Schott).

The fourth lens element 28 forms the third lens-element unit LE3. It is manufactured from a further glass type, a lanthanum flint glass, for example N—LaF2 (Schott), and has a convexly curved object-side surface 281 and a concavely curved image-side surface 282. The radius of curvature of the object-side surface 281 is 6.0257±0.30 mm; the radius of curvature of the image-side surface 282 is 51.2517±2.56 mm. The vertex of the object-side surface has a distance of 2.5±0.13 mm from the vertex of the image-side surface 262 of the third lens element 26; the vertex of the image-side surface 282 has a distance of 1.25±0.06 mm from the vertex of the object-side surface 281.

The lens-element system 10 substantially consists of the lens-element units LE1, LE2, and LE3. The expression "substantially consists of" means that, in addition to the lens elements mentioned above as constituent parts, the optical lens-element system may also include lens elements which have practically no refractive power, optical elements other than lens elements such as a stop, a mask, a glass cover and/or filter, mechanical components such as lens-element flanges, a lens-element tube, an imaging element and/or a camera shaking correction mechanism. In the exemplary embodiment shown in FIG. 1, the entire lens-element system 10 should be positioned 2.5±0.13 mm in front of the camera module 12, more precisely in front of the coverslip 14 with object-side and image-side surfaces 141, 142 which are assumed to be planar. The following table reproduces the assumed parameters during the calculation of the exemplary embodiment of a lens-element system 10 described above.

| Reference sign of the surface | Radius in mm | Thickness in mm | Glass type |
| --- | --- | --- | --- |
| 221 | 83.8557 | 0.4150 | N-LaSF9 (Schott) |
| 222 | 6.4250 | 2.220 | N-SK16 (Schott) |
| 241 | 6.4250 | — | |
| 242 | −8.8889 | 0.0550 | |
| 261 | 10.6175 | 1.2500 | N-SK16 (Schott) |
| 262 | −106.0916 | 2.500 | |
| 281 | 6.0657 | 1.2500 | N-LaF2 (Schott) |
| 282 | 51.2518 | 2.5000 | |
| 141 | ∞ | 0.2400 | N-BK7 (Schott) |
| 142 | ∞ | 0.4600 | |
| 15 | 0 | 0.0000 | |
| 18 | 0 | 4.0000 | |

The lens-element system 10 in FIG. 1 has a maximum lens-element diameter of 12 mm and is approximately 30 mm long. By using a larger number of lens elements, for example seven, it is possible to achieve maximum lens-element diameters of 10 mm for a field dimension of 6 mm and a stop number of f/2. Then, the overall length is approximately 25 mm.

Figure 2:
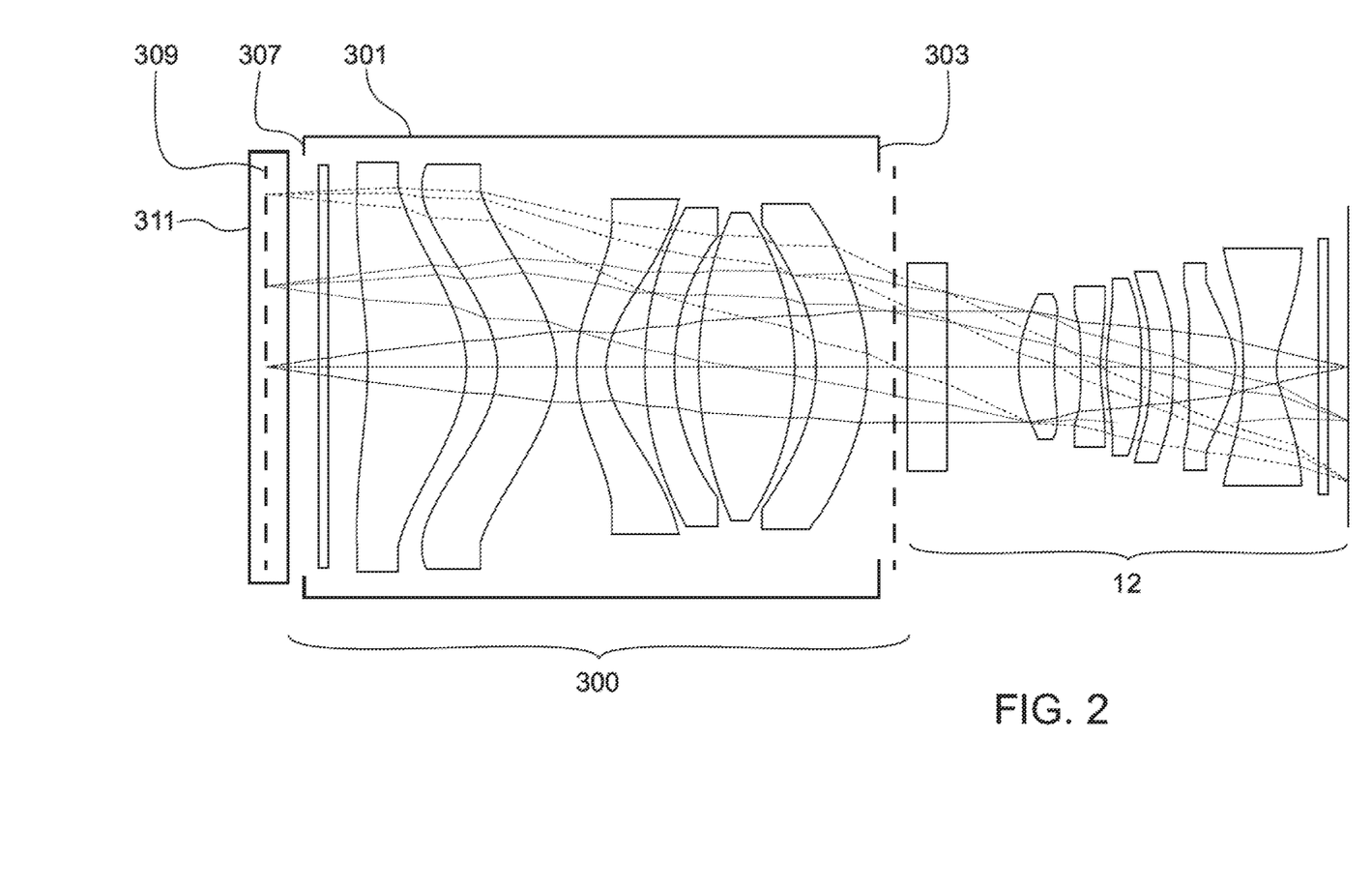
FIG. 2 shows, in a lens-element section, a second exemplary embodiment of a supplementary lens acting as a microscope supplementary lens.

In this context, FIG. 2 shows, in a lens-element section, a second alternative exemplary embodiment of a lens-element system 300 for a supplementary lens, which system can be used as a microscope supplement. In comparison with the illustration of FIG. 1, the optical unit is illustrated with individual lens elements in the camera module 12. A more detailed description of the individual lens elements and surfaces is dispensed with in this and the following embodiments.

The lens-element system 300 depicted in FIG. 2 is integrated into an image-side supplementary lens 301 and may be part of a supplementary lens system. However, the supplementary lens 301 can also be used on its own, as it is suitable as a microscope/macro supplement. The supplementary lens 301 has an image-side coupling apparatus 303, which serves for coupling to the camera module 12. At the same time, provision can be made for a pupil intervention apparatus 305 to be attachable to the coupling apparatus 303, said pupil intervention apparatus 305 being illustrated using dashed lines in FIG. 2. By way of example, this may be an apodization filter, a pupil forming apparatus, a polarization filter, or a phase or wave front element. The pupil intervention elements can also be inserted or introduced in a changeable manner.

Moreover, the supplementary lens 301 has an object-side coupling apparatus 307. By way of example, a further supplementary lens (not depicted here) can be couplable thereto. Alternatively, or additionally, a field intervention element (not depicted here) may be couplable to the object-side coupling apparatus 307. The object-side coupling apparatus 307 is situated in the region of an intermediate image 309, which is illustrated using dashed lines in FIG. 2.

Likewise, alternatively, or additionally, a receiving apparatus 311 for an object to be observed may be provided at the object-side coupling apparatus 307. The receiving apparatus 311 is only illustrated schematically in FIG. 2 and may be embodied, for example, as an object carrier.

Additionally, or alternatively, the receiving apparatus 311 may be embodied as an illumination system. The illumination system may be embodied as a phase contrast illumination or as a dark field illumination. It is possible to use particularly suitable illumination pupil forms for improving the resolution. Thus, for example, it is possible to realize flexible illumination types by modifying the numerical aperture. This may influence the depth of field and is dependent on the object structure. In some cases, it is preferable to use so-called "low-sigma distributions" or "high-sigma distributions". In order to improve the resolution, it may be expedient to use a ring-shaped structure for obtaining an annular phase distribution in the case of the phase contrast method.

The lens-element system 300 in FIG. 2 includes six lens-element units, some of which have a spherical design and some of which have an aspherical design. In an overarching manner, the lens-element system 300 has lens-element diameters of less than 9 mm and the lens-element system 300 has a length of approximately 22 mm. In the present case, the lens-element system 300 is embodied with plastic elements.

Figure 3:
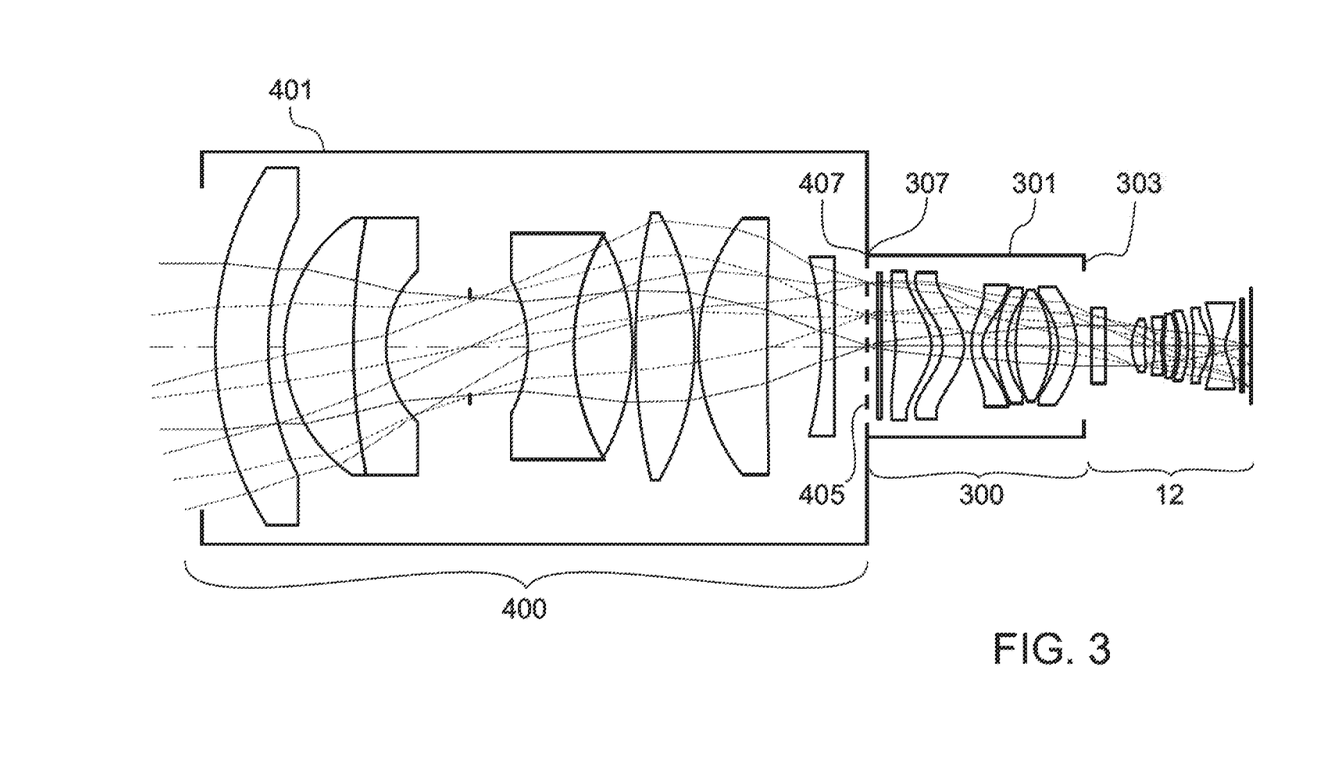
FIG. 3 shows, in a lens-element section, an exemplary embodiment of a supplementary lens system for a camera module, which is designed as a telephoto lens system.

In addition to the lens-element system 300 for a supplementary lens 301, already shown in FIG. 2, FIG. 3 shows, in a lens-element section, in front of a camera module 12, a lens-element system 400 for a further, object-side supplementary lens 401 which, altogether with the lens-element system 300 and the camera module 12 operates as a telephoto lens with an equivalent focal length in respect of the 35 mm format of 120 mm. While the lens-element system 300 of the image-side supplementary lens 301 has a length of approximately 22 mm, the lens-element system 400 for the object-side supplementary lens 401 additionally contributes approximately 45 mm. Lengths of less than 40 mm are achievable with a further optimization of the lens-element system 400, said lengths also being usable for camera modules with a large aperture, e.g., f/1.4 or f/1.8 in the case of a lens element/lens diameter of less than 12 mm.

The supplementary lens 401 has an image-side coupling apparatus 407 that is couplable to the coupling apparatus 307 of the image-side supplementary lens 301. The image-side coupling apparatus 407 of the object-side supplementary lens 401 is furthermore designed to receive a field intervention element 405—illustrated using dashed lines in FIG. 3. By way of example, the field intervention apparatus 405 can be a greyscale filter, a microlens array, a phase wedge plate, and/or a field curvature plate.

Figure 4:
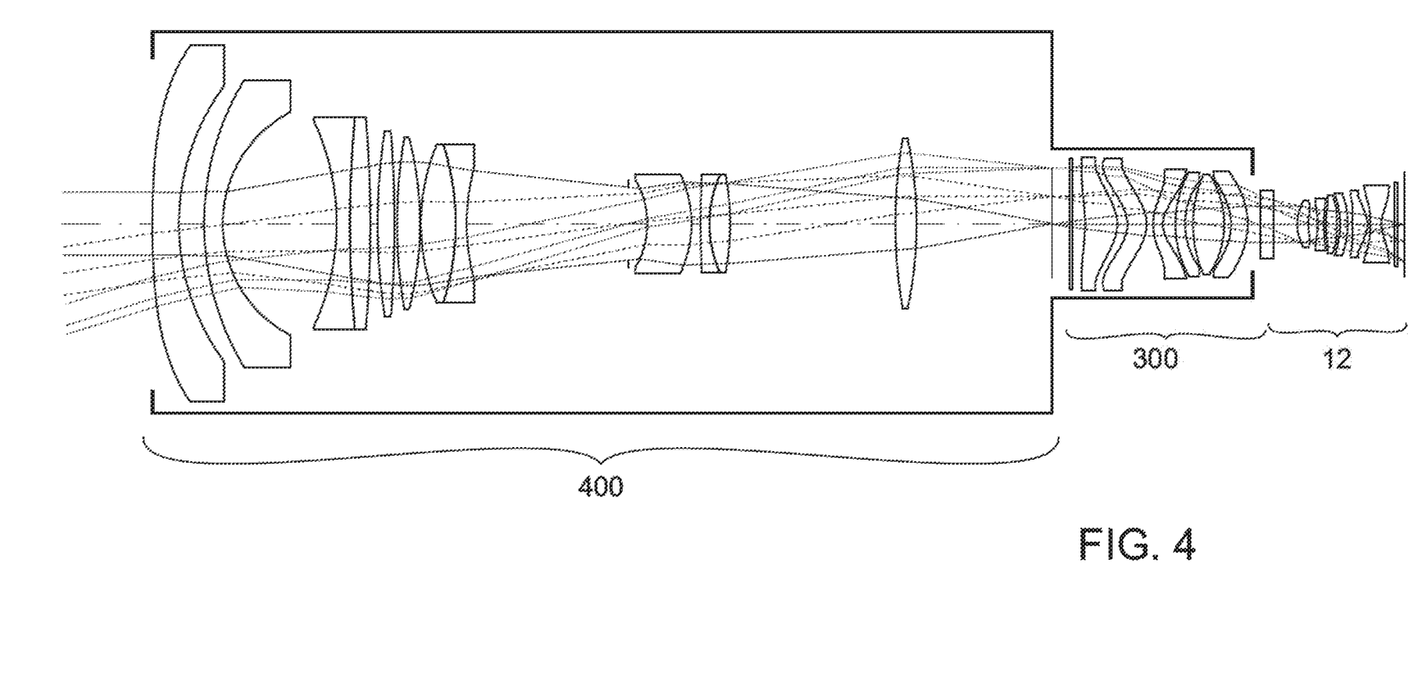
FIG. 4 shows, in a lens-element section, an exemplary embodiment of a supplementary lens system for a camera module, which is designed as a zoom lens system.

FIG. 4 shows, in a lens-element section, an alternative lens-element system 400 for an object-side supplementary lens, which is combined by way of an image-side supplementary lens with the lens-element system 200. In this lens-element system combination, a zoom lens with a 28-85 mm equivalent focal length in relation to the 35 mm format emerges, the zoom lens having a length of approximately 69 mm in the shown exemplary embodiment. Lengths between 45 mm and 50 mm are achievable in the case of further optimization.

Overall, the concept according to the exemplary embodiments of the invention of dividing a supplementary optical unit in front of a camera module into two, with the formation of an intermediate image, facilitates the realization of high-quality lens-element/supplementary lens systems with significantly smaller diameters than existing approaches. A very compact, portable and capable microscope optical unit already results from the individual image-side supplementary lens.

The exemplary embodiment of a mechanically accessible interface at the location of the intermediate image facilitates near-field interventions, which are superposed on the actual image. By way of example, greyscale filters for HDR recordings and curved phase elements, for example for a retro panoramic lens effect or, e.g., for in-focus imaging of areas with different geometry, are possible.

On account of the small diameters, the system is particularly suitable for electronic devices with two closely adjacent camera modules.

It is understood that the foregoing description is that of the exemplary embodiments of the invention and that various changes and modifications may be made thereto without departing from the spirit and scope of the invention as defined in the appended claims.

What is claimed is:

1. A supplementary lens system for providing at least one supplementary lens in front of a camera module of an electronic device, the supplementary lens system comprising:

an object-side lens-element unit having a positive refractive power; and an image-side lens-element unit having a positive refractive power, wherein:

the object-side lens-element unit and the image-side lens-element unit are configured to generate an intermediate image between the object-side lens-element unit and the image-side lens-element unit, the supplementary lens system has an object-side supplementary lens and an image-side supplementary lens, and the object-side and the image-side supplementary lenses are couplable to one another.

2. The supplementary lens system according to claim 1, wherein:
the object-side lens-element unit has a first focal length f1,
the image-side lens-element unit has a second focal length f2,
the object-side lens-element unit and the image-side lens-element unit have a distance d from one another, and
a sum of the first and second focal lengths is equal to the distance d defined by principal planes of the object-side and the image-side lens-element units in accordance with the equation:

$$f1+f2=d.$$

3. The supplementary lens system according to claim 2, wherein the intermediate image is generated at a site spaced apart from a principal plane of the object-side lens-element unit by the first focal length f1 and spaced apart from a principal plane of the image-side lens-element unit by the second focal length f2.

4. The supplementary lens system according to claim 1, wherein the supplementary lens system has an afocal design.

5. The supplementary lens system according to claim 1, wherein the object-side lens-element unit and the image-side lens-element unit are matched to one another with respect to at least one of telecentricity, numerical aperture, and field dimension.

6. The supplementary lens system according to claim 1, wherein at least one of the object-side lens-element unit and the image-side lens-element unit are configured to permit a chief ray to include an angle of less than or equal to 15° with an optical axis of a respective lens-element unit.

7. The supplementary lens system according to claim 1, wherein at least one of the object-side lens-element unit and the image-side lens-element unit are configured to permit a chief ray to include an angle of less than or equal to 10° with an optical axis of a respective lens-element unit.

8. The supplementary lens system according to claim 1, wherein at least one of the object-side lens-element unit and the image-side lens-element unit are configured to permit a chief ray to include an angle of less than or equal to 5° with the optical axis of a respective lens-element unit.

9. The supplementary lens system according to claim 1, wherein the object-side and the image-side supplementary lenses are couplable to one another by an interface and the interface is arranged in a region of the intermediate image.

10. The supplementary lens system according to claim 9, further comprising a field intervention apparatus, wherein the field intervention apparatus is arrangeable in a region of the intermediate image.

11. The supplementary lens system according to claim 10, wherein the field intervention apparatus comprises at least one of a greyscale filter, a microlens array, and a field curvature plate.

12. The supplementary lens system according to claim 10, wherein the field intervention apparatus is couplable to the interface.

13. A field intervention apparatus for a supplementary lens system according to claim 10.

14. The supplementary lens system according to claim 1, wherein a pupil intervention apparatus is provided on an image side of the image-side lens-element unit.

15. The supplementary lens system according to claim 14, wherein the pupil intervention apparatus comprises a pupil forming apparatus, an apodization filter, or a correction element.

16. The supplementary lens system according to claim 14, wherein the pupil intervention apparatus is couplable to an interface.

17. A pupil intervention apparatus for a supplementary lens system according to claim 14.

18. The supplementary lens system according to claim 1, wherein the object-side supplementary lens is configured as at least one of an imaging lens, a wide-angle lens, a telephoto lens, a zoom lens, a microscope objective, or a macro lens.

19. A supplementary lens for a supplementary lens system according to claim 1.

20. A supplementary lens according to claim 19, configured to permit the supplementary lens together with a camera module to generate an image with a scale of 1:0.5 up to 1:2.

21. The supplementary lens according to claim 19, wherein the supplementary lens is an image-side supplementary lens and forms a relay optical unit together with the camera module.

22. The supplementary lens according to claim 19, further comprising a receiving apparatus for an object carrier.

23. The supplementary lens according to claim 22, wherein the object carrier is configured to be couplable to the interface.

24. An object carrier for a supplementary lens according to claim 19.

25. An illumination system for a supplementary lens according to claim 19, wherein the illumination system is couplable to an interface.

26. The illumination system according to claim 25, wherein the illumination system includes at least one of an aperture stop and a radiant field stop.

27. The illumination system according to claim 25, wherein the illumination system includes an illumination aperture which is adaptable to the lens aperture and/or a size of the illuminated object field is adaptable.

* * * * *